Aug. 18, 1970  M. A. CHAVANNES  3,524,787
APPARATUS FOR THE MANUFACTURE OF PLASTIC LAMINATES
Original Filed Dec. 26, 1963  2 Sheets-Sheet 1
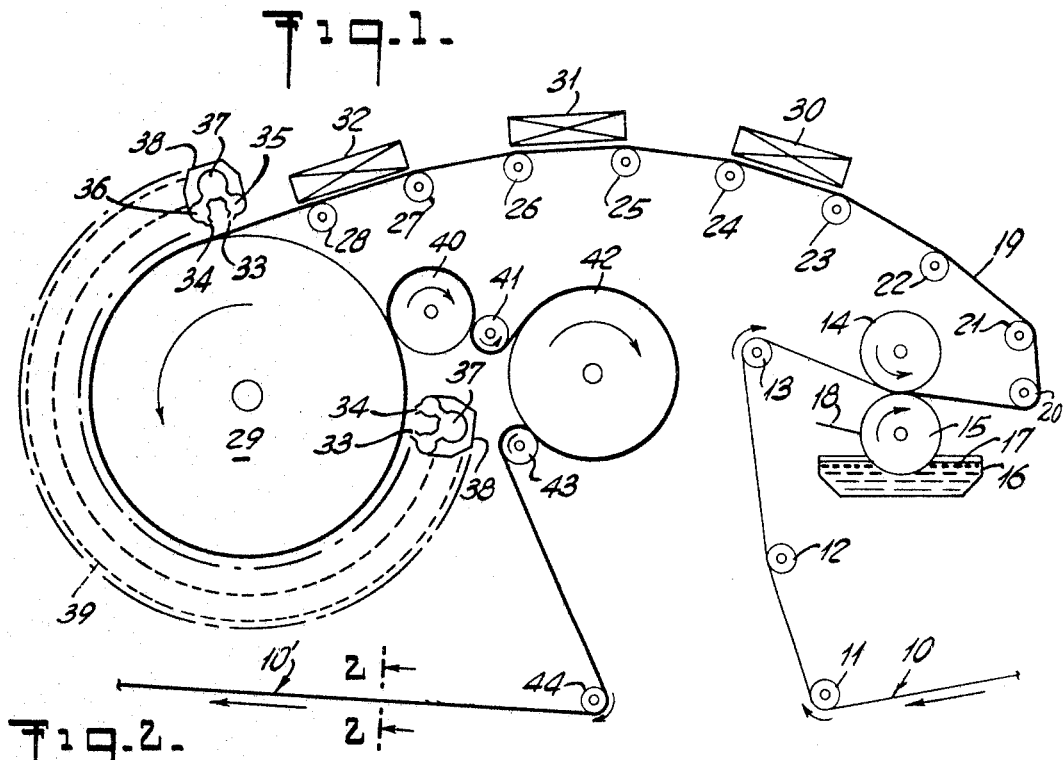
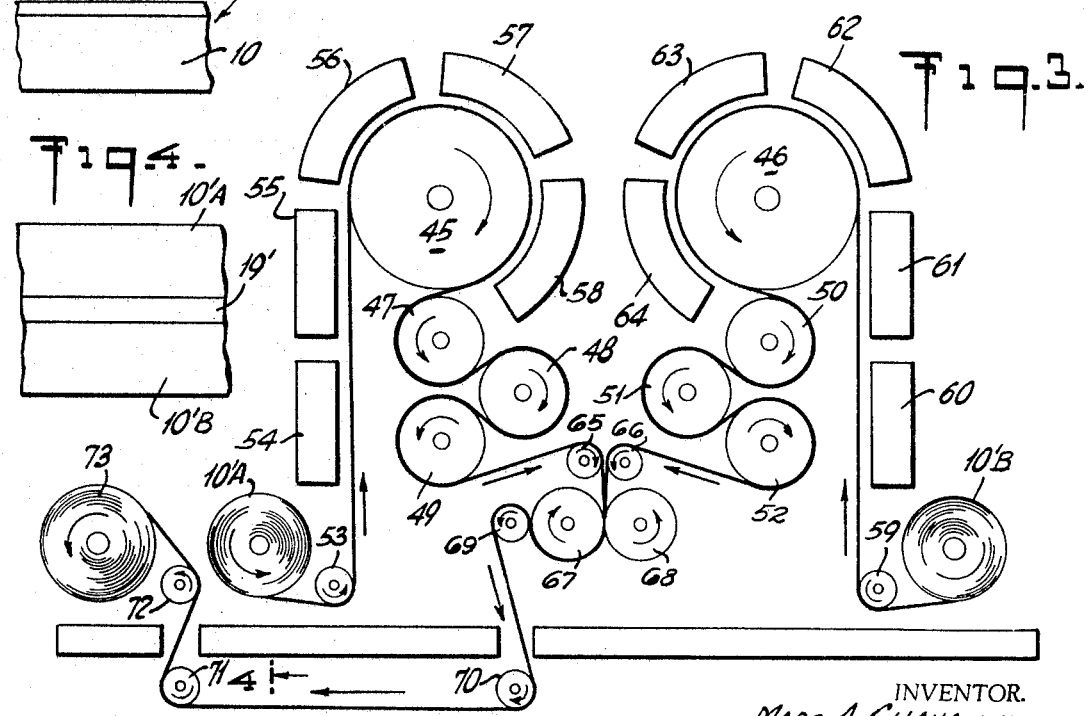
INVENTOR.
MARC A. CHAVANNES
BY
ATTORNEY Aug. 18, 1970 M. A. CHAVANNES 3,524,787
APPARATUS FOR THE MANUFACTURE OF PLASTIC LAMINATES
Original Filed Dec. 26, 1963 2 Sheets-Sheet 2

INVENTOR.
MARC A. CHAVANNES
BY
ATTORNEY

United States Patent Office 3,524,787
Patented Aug. 18, 1970

3,524,787
APPARATUS FOR THE MANUFACTURE OF PLASTIC LAMINATES
Marc A. Chavannes, New York, N.Y., assignor to Sealed Air Corporation, Hawthorne, N.J., a corporation of New Jersey
Original application Dec. 26, 1963, Ser. No. 336,097, now Patent No. 3,405,020, dated Oct. 8, 1968. Divided and this application June 27, 1968, Ser. No. 740,714
Int. Cl. B32b *31/00*
U.S. Cl. 156—498       6 Claims

ABSTRACT OF THE DISCLOSURE

Improved apparatus for the coating and laminating of plastics which are particularly useful for the manufacture of cellular materials.

---

This application is a division of application Ser. No. 336,097, filed Dec. 26, 1963, now U.S. Pat. No. 3,405,020, entitled, Method and Apparatus for the Manufacture of Plastic Laminates and Cellular Materials.

This invention relates to the coating and lamination of plastic materials and more specifically to a novel and improved method and apparatus for producing plastic sheet laminates.

While plastic materials, and particularly plastic materials in sheet form, are used in a great variety of applications, perhaps the largest use is for the packaging of materials since plastics generally offer numerous advantages over paper products. For instance, plastics generally will resist the deleterious effects of moisture and other liquids and gases that damage or destroy paper. The more common plastics used for packaging such as polyethylene and polyvinyl chloride are not entirely satisfactory because they are not entirely impervious to moisture vapor and gases. Certain of the more expensive plastics such as polyvinylidene chloride are substantially impervious to moisture vapor and other gases but are more costly and heavier in weight. The lamination of plastics such as polyethylene and polyvinyl chloride with the more impervious plastics such as polyvinylidene chloride have been suggested, but the cost involved in laminating sheets of these plastics makes their use for packaging purposes generally prohibitive and the resultant laminate is, of course, relatively thick and heavy.

One aspect of this invention concerns a novel and improved method and apparatus for coating plastics such as polyethylene, polyvinyl chloride, polypropylene, nylon, cellulose acetate, polystyrene and others, with a very thin coating of a more impervious plastic such as polyvinylidene chloride, fluorocarbons, and the like. With this invention, exceedingly thin coatings of plastic such as saran (polyvinylidene chloride) can be applied to some of the more inexpensive plastics to form a composite laminate that is relatively inexpensive and yet has such desirable properties as imperviousness to moisture and gases and light weight.

In cases wherein plastics having relatively low melting points are coated with saran having a higher melting point, the invention further contemplates a novel and improved method and apparatus for sealing the saran coatings one to the other to provide laminates wherein the saran is contained between outer layers of another plastic and for the fabrication of cellular material wherein one of the sheets is embossed prior to the lamination. In both of these cases, the saran is fully protected against abrasion and at the same time is prevented from attacking and corroding certain metals and other materials. By having the saran contained wholly within the plastic product, whether it be an embossed or unembossed laminate, provides a relatively inert packaging material that is substantially impervious to gases and moisture vapor, has improved strength, and at the same time can be fabricated at relatively low cost.

A still further object of the invention resides in the provision of a novel and improved laminated plastic material that is characterized by its increased imperviousness to gases and its relative inertness.

The above and other objects and advantages of the invention will become more apparent from the following description and accompanying drawings forming part of this application.

In the drawings:

FIG. 1 is a diagrammatic illustration of one embodiment of coating apparatus for producing the laminate in accordance with the invention;

FIG. 2 is a greatly enlarged cross-sectional view of FIG. 1 taken along the line 2—2 thereof and showing the resultant laminate.

FIG. 3 is a diagrammatic illustration of modified coating and laminating apparatus in accordance with the invention;

FIG. 4 is a cross-sectional view of FIG. 3 taken along the line 4—4 thereof and showing a greatly enlarged cross-sectional view of the material in accordance with the invention;

Figure 5:
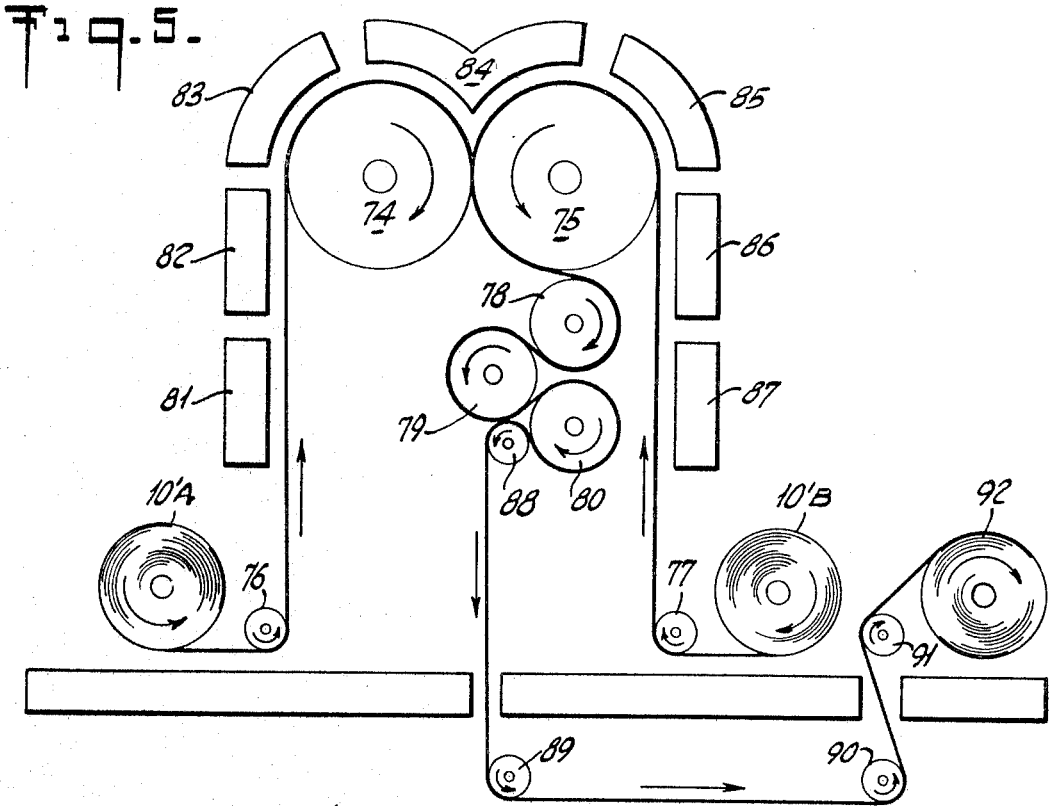
FIG. 5 is a diagrammatic view of another embodiment of apparatus in accordance with the invention for producing a laminated plastic product.

As pointed out above, three factors have been found most significant when utilizing plastics for packaging and other similar purposes, namely, cost, imperviousness to gases, moisture vapor and the like, and mechanical strength. With cellular materials wherein a plastic layer is embossed and a second layer is sealed to the embossed layer to provide a plurality of air pockets, the utilization of substantially impervious plastics is of considerable importance to prevent the loss of cushioning effect when the material is under constant and sustained pressure.

This invention provides means for producing a relatively inexpensive plastic material that may be used in sheet form or may be processed to provide a cellular material and which affords benefits not heretofore attainable with known practices. For instance, with this invention, it is possible to provide plastic laminates wherein the base material may be in the order of one-half to several mils and even thicker, while the relatively impervious layer can be of the order of one-tenth of a mil through the thickness is not critical. In this way, the weight of the resultant laminate is maintained at a very low value. Since the impervious material, which is a costly product as compared with plastic such as polyethylene and polyvinyl chloride, is used in very small quantities, the resutlant increase in cost is small. Furthermore, when utilizing the processes and apparatus in accordance with the invention, the lamination of the plastics can be carried out at speeds of the order of 1000 feet per minute with the result that processing costs are also minimized.

In the fabrication of cushioning material, it is possible in accordance with the invention to coat a plastic material with an impervious layer and immediately process the resultant laminate to provide a cellular material. In this way, intermediate handling of the laminated sheets is avoided, which further reduces the cost of the finished product. Furthermore, with the invention, a wide range of cellular materials can be produced utilizing double and triple laminates with any desired combinations of plastics, plastic coated papers, fabrics, and the like. Further, the invention provides for improved modes of sealing laminates in the fabrication of embossed and unembossed laminated plastic sheets.

Reference is now made to FIG. 1, illustrating one embodiment of the invention for coating plastic sheeting. In producing the laminate in accordance with the invention, a base material, such as polyethylene, is in sheet form and is fed continuously through laminating apparatus. The polyethylene is denoted by the numeral 10 and enters the apparatus from the right side. It is guided by a series of rollers 11, 12, and 13 to a pair of rollers 14 and 15 which apply a coating of another plastic to one side thereof. The coating on film 10 may be an emulsion, dispersion or solution 17 and is contained within a suitable trough 16. The roller 15, in the form of a rotogravure printing roll, is at least partially immersed in the liquid 17 and becomes coated as it is rotated. A doctor blade 18 engages the surface of the roller 15 and removes excess liquid that may adhere thereto. When the roller 15 contacts the film 10, the latex liquid or solution 17 is printed on the film and denoted by the numeral 19. The roller 14 acts as a backing roller for the roller 15 to insure uniform deposition of the layer 19 on the film. The printed film is then carried about a series of rollers 20 through 28 which are disposed in arcuate configuration and guide the coated film onto a relatively large cylinder or drum 29 on which the coated layer of plastic is dried and cured. This improved coating process enables the application of exceedingly thin, uniform layers at very high speeds.

The apparatus shown in FIG. 1 is particularly applicable for use in applying a coating of polyvinylidene chloride to the base film 10, and the thickness of the coating so applied is governed by the depth of the depressions in the printing roller 15. By making the depressions in the printing roller relatively shallow, it is possible to surface the base film 10 with a layer of polyvinylidene chloride having a thickness of the order of .0001". The coating liquid may, of course, take a variety of forms through a particularly good one is a latex in which approximately 90% by weight of polyvinylidene chloride and 10% by weight of acrylonitrile have been copolymerized together. This produces an elastic coating that may be readily embossed. The particle size of the material should preferably not exceed .25 micron, and the mixture is then combined with an emulsifying agent and water to provide a latex having a suitable viscosity for application to the base film by means of a printing roller as described above. While it would be possible to use an appropriate solvent in place of the water and emulsifying agent for the production of the liquid latex, it is important that the solvent does not attack or penetrate the base material, for under such circumstances the base material would tend to absorb the solvent and it would then be difficult and time-consuming to remove it from the base material. In cases where the base material will not absorb the solvent, a solution of the plastic may be utilized in place of the latex.

As the film 10 with the latex coating 19 on the surface thereof passes over the rollers 20 through 28 which are preferably driven at a uniform speed, the individual islands of the latex material deposited by the printing roller 15 spread on the surface of the base material and produce a uniform coating. Initial heating of the film is accomplished by heat radiators 30, 31, and 32 which preheat the supporting film and the deposited layer to a temperature substantially below that of the melting point of the supporting layer.

The drum 29 about which the coated material 10 is fed is preferably maintained at a temperature high enough to prevent excessive loss of heat from the laminate and yet not melt the supporting layer. The layer 19 is cured and dried while passing around the drum 29 by means of a plurality of air jets 33 and 34. The air jets 33 are in the form of a plurality of closely spaced orifices formed in a transverse tube 35, while the jets 34 constitute a plurality of orifices in an adjoining laterally disposed tube 36. The tubes 35 and 36 are connected to a central manifold 37 and each pair of tubes 35 and 36 together with the common manifold 37 are housed in a surrounding shield 38. Hot air is fed to the plurality of manifolds 37 by a primary manifold 39 shown in dotted outline. With this arrangement, jets of hot air impinge on the layer 19 as the material passes about the drum 29.

When utilizing a polyvinylidene chloride emulsion, the temperature of the air exhausted by the jets 33 and 34 should preferably be of the order of 300° F. to 400° F. This raises the temperature of the polyvinylidene coating and at the same time the drum 29 maintains the base material below the melting point of that material. Using polyethylene and the base material, it has been found that with a drum having a diameter of about 54 inches and with the base material traveling at a speed of approximately 1000 feet per minute, the infrared heaters 30 through 32 should emit sufficient heat to raise the temperature of the latex coating to a value not exceeding 175° F. Air temperatures of 300° F. to 400° F. will then completely dry and cure the coating. With higher melting point base materials, higher preheating temperatures can be used.

After the material emerges from beneath the last of the air jets, it is removed from the drum 29 by a series of driven rollers 40 through 44 with the rollers 40 and 42 being cooled to bring the composite film or laminate 10' to room temperature.

The completed laminate 10' is shown in FIG. 2, and it will be observed in this greatly enlarged cross-sectional view that the layer 19 is very thin as compared to the base material 10.

The film 10' produced in accordance with the method and apparatus shown in FIG. 1 may be utilized to produce a three layer film with the central layer being impervious to gas and moisture vapor, while the outer layers may be heat sealable at relatively low temperatures. For this purpose, the film 10' can be made of a relatively thin base layer 10, as, for instance, .001 inch in thickness and the latex layer 19 may be of the order of .0001 of the thickness of the base layer. The completed material 10' may be rolled on a spool with the impervious layer facing inwardly or fed directly to apparatus for fabricating cellular material such as shown in FIGS. 7 and 8.

In accordance with the apparatus and method shown in FIG. 3, two sheets of the film 10' are joined to form the triple layer material. More specifically, the structure of FIG. 3 comprises a pair of drums 45 and 46 which are preferably maintained at a temperature materially below the melting point of the heat sealable base layer of the composite sheets being joined. In the case of polyethylene, the temperature should preferably not exceed 180° F. Below the drum 45 there is a series of three driven rollers 47, 48, and 49 over which one film is fed. A similar set of rollers 50, 51 and 52 are disposed below the drum 46.

Film from a first roll 10'A is fed over a guiding roller 53, thence upwardly about the drum 45 and about the rollers 47 and 49. A series of radiant heaters 54 through 58 are positioned adjacent to the path of the film from the roll 10'A and about the drum 45 to preheat the supporting film and the impervious layer, such as polyvinylidene chloride, to a temperature not exceeding 175° F. It has been found that heaters radiating infrared wavelengths in the approximate range of 3.2 to 3.5 microns produce good results.

Coated film from a second roll 10'B is fed about the guiding roller 59 and thence upwardly about the drum 46 and the rollers 50 through 52. A similar set of radiant heaters 60 through 64 are disposed along the path of the film from the roll 10'B and about the drum 46 to heat the supporting film and the polyvinylidene layer in the same manner as described in connection with the film from the roll 10'A. The rollers 47 through 49 and 50 through 52 are preferably cooled to bring the temperature of the polyvinylidene layer to approximately 60° F. after having been heated by the infrared heaters. This causes the polyvinylidene to become amorphous and this state will continue for hours.

The treated films 10'A and 10'B are then directed over rollers 65 and 66 and are brought together between pressure rollers 67 and 68 with the polyvinylidene coatings in contact one with the other. In so doing, two layers will firmly and permanently cohere one to other so that the polyvinylidene coatings will join to form in effect a single central layer. The film is then carried by rollers 69, 70, 71 and 72 to a spool 73 on which the completed film is wound. A fragmentary cross-sectional view of the completed film is shown in FIG. 4 and it will be observed that the vinylidene layer 10' is substantially homogeneous and is relatively thin as compared with the surface layers of heat sealable plastic 10A and 10B. When using base films of the order of one-half mil in thickness, the total thickness of the composite laminate will be only slightly greater than one mil.

The laminate produced in accordance with the method and the structure of FIG. 3 can be accomplished at exceedingly high rates of speed of the order of 1,000 feet per minute and it is evident that it may be combined with a device such as shown in FIG. 1 for continuously producing the three-ply laminated plastic without the need for handling the coated base material between the steps of the process.

Modified apparatus and method for producing the three-ply laminate from two coated films is shown in FIG. 5. In this embodiment of the invention, two drums 74 and 75 corresponding to drums 45 and 46 of FIG. 3 are placed in adjoining relationship and spaced apart a distance slightly less than the total distance of the two films 10'A and 10'B to be joined one to the other. In this way, the two films are placed under pressure to effect the joinder. The individual films 10'A and 10'B are passed about rollers 76 and 77, respectively, thence upwardly about the drums 74 and 75 and the joined film is then passed about cooling rollers 78, 79, and 80. The two films 10'A and 10'B are preferably fed onto and about the drums 74 and 75 with the polyvinylidene coating on the outer sides. The coatings and the supporting film are heated by infrared heaters 81 through 87 to raise the temperature of at least the coatings to about 250° F. to 275° F. When the polyvinylidene coatings on the films are brought together in this heated state, they will adhere, and the rollers 78 through 80 are cooled to immediately lower the temperature of the film preferably below 100° F. The completed film then passes over rollers 88, 89, 90, and 91 and is wound on a spool 92.

In certain instances, it is desirable to utilize a primer on the base material in order to produce better adhesion between the impervious coating and the base material, as, for instance, an epoxy or a resin having a butadiene base such as the combination of polyvinyl chloride and butadiene. In most applications, it is desirable to user a water dispersion of the resin through it is possible to utilize a solution provided, however, that the solvent will not attack the base material as previously described.

Figure 6:
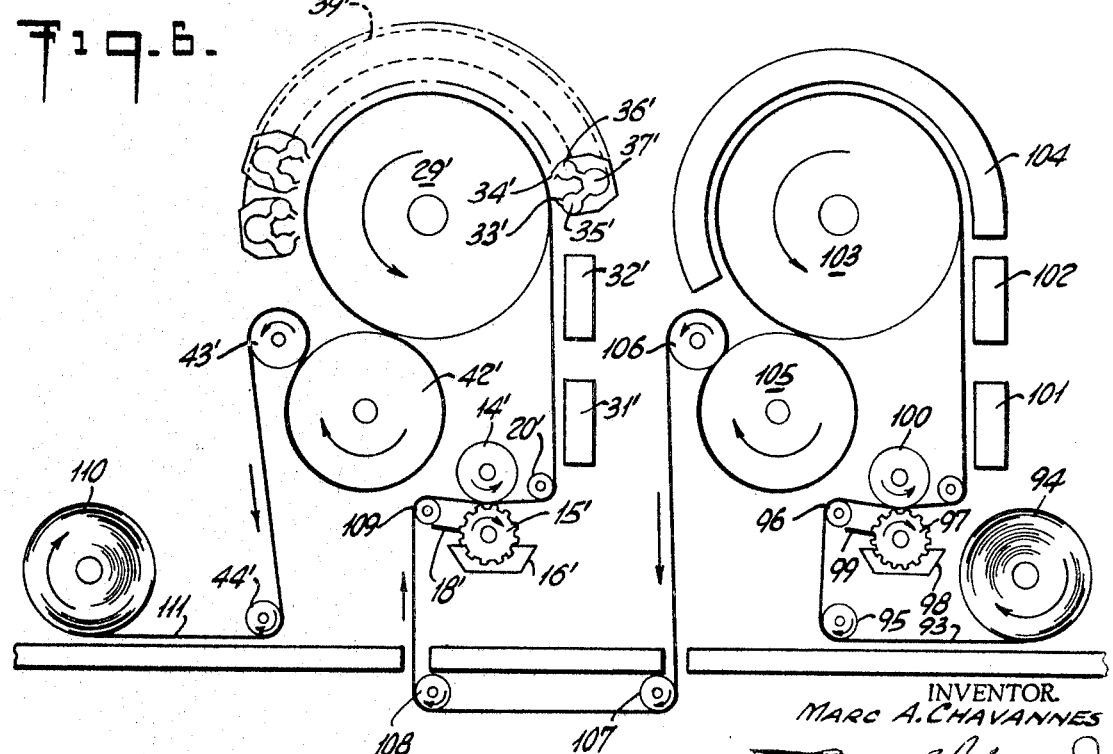
FIG. 6 is a diagrammatic view of still another embodiment of apparatus in accordance with the invention.

The lamination of plastics utilizing a primer is shown in FIG. 6 wherein the base material is denoted by the numeral 93. It is fed from a roll 94 about rollers 95 and 96 to a suitable printing roll 97. The printing roll 97 has a portion of its periphery immersed in a bath 98 containing the primer, and the amount of primer adhered to the roll is controlled by the doctor blade 99 and the depth of the depressions in the printing roller. A backup or pressure roller 100 cooperates with the printing roller 97 so that some pressure is applied to the film to insure uniform application of the primer to the base material 93. After the base material 93 has been coated it passes upwardly past radiant heaters 101 and 102 and thence about a drum 103. It is preferable to maintain the drum 103 below the melting point of the base material 93 as described in connection with the previous embodiments of the invention. The structure 104 surrounding a portion of the periphery of the drum 103 is identical to the structure surrounding the drum 29 shown in FIG. 1 and provides a plurality of air jets for the direction of heated air onto the coating.

While any suitable primer may be used, an example of a satisfactory primer is a polyvinylidene dispersion containing a partially polymerized resin and about 40% solids such as colloidal silica. After the primer coating has been heated and cooled in substantially the same manner as the polyvinylidene latex coating previously described, the film passes over rollers 106 to 109 for a coating of polyvinylidene latex as described in FIG. 1.

The application of the coating of polyvinylidene and its curing is accomplished in a manner identical to that illustrated and described in connection with FIG. 1, and, accordingly, like primed numerals have been utilized to identify corresponding elements of FIGS. 1 and 6. For instance, the polyvinylidene is applied by the printing roller 15' in cooperation with the backing roller 14', it then passes about the roller 20' and then upwardly past radiant heaters 31' and 32' and about the roller 29' during which period hot air from jets 33' and 34' impinge on the layer to effect the cure. The heated material is then taken off the drum 29' and moves about the cooling drum 42' and thence about the rollers 43' and 44' to the spool 110.

The resultant material 111 containing a suitable base sheet with successive coats of a priming resin and an impervious resin such as polyvinylidene may then be utilized in that form for packaging or other applications or two such laminates 111 may be joined to produce a composite structure by means of the methods and apparatus illustrated and described in connection with FIGS. 3 and 5.

From the foregoing, it is evident that this improved material can be manufactured at exceedingly high rates of speed and that relatively small amounts of the impervious resin are required in order to produce a more effective sheet material and at the same time having substantial strength and heat sealable characteristics. The utilization of relatively small amounts of impervious resin such as polyvinylidene adds very little to the resultant cost of the sheet material, and actual practice has indicated that the great advantages obtained more than outweigh the small additional cost.

The improved laminates, as described above, are relatively light in weight and substantially impervious to gases and moisture vapor. These laminates are particularly useful for the manufacture of cellular material as described in U.S. Letters Patent No. 3,142,599, granted July 28, 1964, entitled, Method for Making Laminated Cushioning Material, wherein at least one of the sheets being laminated is embossed with a plurality of discrete embossments and the embossments are in turn sealed by a backing sheet.

While only certain embodiments of the invention have been illustrated and described, it is evident that alterations, changes and modifications may be made without departing from the true scope and spirit thereof.

What is claimed is:

1. Apparatus for coating a plastic sheet having thermoplastic properties with a liquid containing a plastic having air impervious thermoplastic properties comprising a temperature controlled drum, means maintaining the temperature of said drum just below the melting point of said plastic sheet, coating means continuously applying a substantially uniform coating of said liquid to one side of said plastic and heating means for drying said coating including a plurality of air jets surrounding an appreciable portion of the periphery of said drum and discharging streams of high temperature high velocity air onto said coating to dry said coating uniformly throughout its depth.

2. Apparatus according to claim 1 including means for precoating said plastic sheet with a primer and drying said primer, said primer being selected from the group consisting of epoxy resins and resins containing butadiene.

3. Apparatus for laminating two plastic sheets coated by apparatus according to claim 1 comprising a pair of drums having their peripheries positioned in close proximity one to the other to form a nip therebetween, means for feeding a coated sheet about each of said drums; means for heating at least the coatings on said sheets to a sealing temperature prior to their movement through said nip to seal said coatings one to the other to form effectively a three-ply laminate and means for cooling the resultant laminate.

4. Apparatus for laminating two plastic sheets coated by apparatus according to claim 1 and wherein said coatings contain polyvinylidene chloride, comprising means for heating at least the coatings on said sheets, means for rapidly cooling said coatings to transform them to an amorphous state, a pair of cooperating pressure rollers and means feeding said coated sheets between said pressure rollers to seal said coatings one to the other.

5. Apparatus for coating a plastic sheet according to claim 1 wherein said heating means further includes a plurality of radiant heaters for preheating said coating.

6. Apparatus for coating a plastic sheet according to claim 1 wherein said coating includes polyvinylidene chloride and said apparatus further includes means for rapidly cooling said coating to transform it into an amorphous state.

References Cited

UNITED STATES PATENTS

| | | | |
|---|---|---|---|
| 2,737,467 | 3/1956 | Massey | 156—292 X |
| 2,877,151 | 3/1959 | Doherty et al. | 156—209 X |
| 3,020,194 | 2/1962 | Jerothe | 156—498 X |
| 3,124,476 | 3/1964 | Park et al. | 118—642 X |
| 3,208,898 | 9/1965 | Chavannes et al. | 156—553 X |
| 3,416,984 | 12/1968 | Chavannes et al. | 156—209 |

FOREIGN PATENTS 820,375  9/1959  Great Britain.

JOHN T. GOOLKASIAN, Primary Examiner

J. C. GIL, Assistant Examiner

U.S. Cl. X.R.

118—642; 156—499, 500